United States Patent [19]

Chuang

[11] Patent Number: 4,941,178
[45] Date of Patent: Jul. 10, 1990

[54] SPEECH RECOGNITION USING PRECLASSIFICATION AND SPECTRAL NORMALIZATION

[75] Inventor: Chiu-Kuang Chuang, Lexington, Mass.

[73] Assignee: GTE Laboratories Incorporated, Waltham, Mass.

[21] Appl. No.: 349,877

[22] Filed: May 9, 1989

Related U.S. Application Data

[63] Continuation of Ser. No. 846,939, Apr. 1, 1986, abandoned.

[51] Int. Cl.$^5$ .............................................. G10L 5/00
[52] U.S. Cl. ...................................... 381/41; 381/43
[58] Field of Search ........... 364/513.5, 724.15, 724.17, 364/724.19; 381/36–50

[56] References Cited

U.S. PATENT DOCUMENTS

| | | | |
|---|---|---|---|
| 3,387,093 | 4/1964 | Stewart | 381/37 |
| 3,588,363 | 6/1971 | Herscher | 381/45 |
| 3,681,530 | 8/1972 | Manley et al. | 381/41 |
| 4,349,700 | 9/1982 | Pirz et al. | 364/513.5 |
| 4,394,538 | 7/1983 | Warren et al. | 381/43 |
| 4,400,788 | 8/1983 | Myers et al. | 364/513 |
| 4,415,767 | 11/1983 | Gill et al. | 381/45 |
| 4,454,586 | 6/1984 | Pirz et al. | 364/513.5 |
| 4,488,243 | 12/1984 | Brown et al. | 364/513.5 |
| 4,519,094 | 5/1985 | Brown et al. | 381/43 |
| 4,712,243 | 12/1987 | Ninomiya et al. | 381/43 |
| 4,715,004 | 12/1987 | Kabasawa et al. | 381/43 |
| 4,718,094 | 1/1988 | Bahl et al. | 364/513.5 |
| 4,720,864 | 1/1988 | Tajima et al. | 381/43 |
| 4,736,428 | 4/1988 | Deprettere et al. | 381/38 |

OTHER PUBLICATIONS

Jaschul, "An Approach to Speaker Normalization for Automatic Speech Recognition", ICASSP 79, Apr. 2–4, 1979, pp. 235–238.
C. K. Chuang and S. W. Chan, "Speech Recognition Using Variable-Frame-Rate Coding", *IEEE ICASSP*, pp. 1,033–1,036, Apr. 1983.
F. Itakura, "Minimal Prediction Residual Principle Applied to Speech Recognition", *IEEE Trans. ASSP*, vol. 23, pp. 67–72, 1975.
S. E. Levinson, L. R. Rabiner, A. Rosenberg, and J. G. Wilpon, "Interactive Clustering Techniques for Selecting Speaker-Independent Reference Templates for Isolated Word Recognition", *IEEE Trans. on Acoust., Speech, and Signal Proc.*, vol. 27, p. 134, '79.
A. Oppenheim et al., "Computation of Spectra with Unequal Resolution Using the Fast Fourier Transform", *Proc. IEEE*, vol. 59, pp. 299–301, Feb. 1971.
H. Sakoe and S. Chiba, "Dynamic Programming Algorithm Optimization for Spoken Word Recognition", *IEEE Trans. ASSP*, vol. 26, pp. 43–49, 1978.
"How Digital Signal Processing Works", *High Technology*, Oct. 1985.
H. Matsumoto and H. Wakita, "Speaker Normalization by Frequency Warping", *Speech Research Semi.*, S79–25, Japan, Jul. 1979.
T. Fukabayashi et al., "Speech Segmentation and Recognition Using Adaptive Linear Prediction Algorithm", *IEEE-ICASSP*, pp. 17.12.1–17.12.4.

*Primary Examiner*—Gary V. Harkcom
*Assistant Examiner*—David D. Knepper
*Attorney, Agent, or Firm*—Hamilton, Brook, Smith & Reynolds

[57] ABSTRACT

A two stage classification process is used in a speech recognition system. In the first stage, a slope vector template is generated from an extended LPC analysis using a universal bandwidth expansion technique. Using a dynamic programming technique, that first vector template identifies a subset of the overall vocabulary of the system. The speech signal is inverse filtered using the slope vector and a second LPC analysis is performed on the slope removed speech. The LPC vector is applied to an all-pass filter for initial nonlinear spectral shift of the speech. Final classification is then based on a normalizing spectral warp routine within a dynamic time warp program. The spectral warp is based on a closed form, near log transformation.

51 Claims, 10 Drawing Sheets

SPEECH RECOGNITION USING PRECLASSIFICATION AND SPECTRAL NORMALIZATION

This is a continuation of co-pending application Ser. No. 06/846,939 filed on Apr. 1, 1986, now abandoned.

BACKGROUND

Speech recognition systems are based on the comparison of templates of digital representations of incoming speech with templates of digital representations of reference speech. In one form of speech recognition system, words are represented through the linear predictive coding (LPC) technique.

The LPC technique is based on the recognition that speech production involves excitation and a filtering process. The excitation is determined by the vocal cord vibration for voiced speech and by turbulence for unvoiced speech. The excitation is then modified by the filtering process of resonance chambers of the vocal tract, including the mouth and nasal passages, and the effects of radiation from the lips. The vocal tract has the effect of resonance at formant frequencies. The vocal cords and lip radiation have the effect of a roll-off of the overall energy of the sound with higher frequencies. For a frame of samples of speech, a digital filter can be defined which simulates the formant effects of the vocal tract and the slope function of the vocal cords and the radiation from the lips. The frame of speech can then be defined by that filter and a residual signal which approximates the excitation.

In the LPC technique, speech sound is modelled as an all pole filter excited by an impulse train. The all pole filter is $$H(z) = \frac{G}{A(z)} = \frac{G}{1 - \sum_{i=1}^{P} a_i z^{-i}} \quad (1)$$

where H(Z) is the approximation of the formant and slope function filter and A(Z) is the inverse, LPC filter of the system. The filter is defined by the prediction coefficients $a_i$ in a polynomial function of z. A frame of speech samples is approximated by an excitation signal and the matrix of coefficients, the LPC vector, $a_i$. A series of LPC vectors and the excitation function can be derived from sequential frames of speech samples to define a unit of speech such as a word. By comparing the template of LPC vectors generated from an unknown unit of speech with a set of reference templates of a known unit of speech, the unknown unit of speech can be identified.

Because of differences in words spoken by different individuals and by a particular individual at different times, there will not be an exact match between the generated template and a reference template. To minimize the effects of the speed at which words are spoken, a dynamic programming technique has been developed which provides for nonlinear time alignment, or time warping, of individual LPC vectors to bring each vector into closer correspondence with the vector of the template to which it is being compared. Sakoe and Chiba, "Dynamic Programming Algorithm Optimization for Spoken Word Recognition", *IEEE Trans ASSP*, Vol 26, pp. 43-49, 1978.

Another approach to speech recognition uses a direct spectral domain representation, either a discrete filter bank or the discrete power spectrum generated in a Fourier transform of a speech frame. The template of the transform coefficients of successive frames of speech can be compared to like reference templates to identify a word. In one application of this approach, the slope function of the frequency response is removed and the comparison of templates is based on the fine harmonics of the speech and on the formant frequencies. To allow for shifts in frequency resulting from different speakers, a dynamic programming technique incorporating frequency warping algorithms has been developed to provide spectral warping of each frame of test speech against a reference template. In the spectral warping, a nonlinear spectral shift in which, for example, lower frequencies are expanded and higher frequencies are compressed along the frequency axis has been found to provide better results. Matsumoto and Wakita, "Speaker Normalization by Frequency Warping", *Speech Research Semi.*, S79-25, Japan, July 1979.

SUMMARY OF THE INVENTION

In accordance with the present invention a speech recognition system includes means for generating a first set of speech vectors. That first set of speech vectors is compared with a first set of reference vectors in a preclassification step by which a subset of the total vocabulary of the system is identified. Then, a second set of speech vectors is generated, and this second set of speech vectors is compared to a second set of reference vectors corresponding to the identified subset in a final classification step to identify a particular word. Preferably, the second set of speech vectors is derived from inverse filtered speech which is normalized with respect to the first set of vectors.

Preferably, the two sets of speech vectors are generated in respective LPC analyses. The first set of LPC vectors defines the slope function of the frequency characteristics of a frame of speech samples to provide broad phonetic preclassification which is followed by final articulate classification. By bandwidth reduction of the inverse filter of the second LPC analysis, the formant peaks can be enhanced. Further, spectral warping is provided in at least the second classification step by including a spectral warping routine within a dynamic time warping program. Preprocessing by near log transformation and dynamic spectral warping by a closed form, near log transformation of the second set of vectors can be obtained by the all-pass filtering technique of Oppenheim et al., "Computation of Spectra With Unequal Resolution Using the Fast Fourier Transform," Proc. IEEE, vol 59, pp 299-301, Feb. 1971.

The slope function vectors are preferably obtained by an extended LPC analysis with concatenated inverse filters using a universal bandwidth expansion technique described as follows:

$$B(z) = 1 - \sum_{i=1}^{K} b_i(rz)^{-1} \quad (2)$$

where each $b_i$ is defined as the product of two identical A(z) filters as defined in equation (1):

$$b_i = \sum_{n=0}^{i} a_n a_{i-n}, \, i = 1, 2, \ldots, k \quad (3)$$

Here, r is a bandwidth broadening factor equal to exp($\pi$DT), where D and T are the bandwidth of the pole and the sampling interval, respectively, and the a's are the LPC coefficients.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1A:
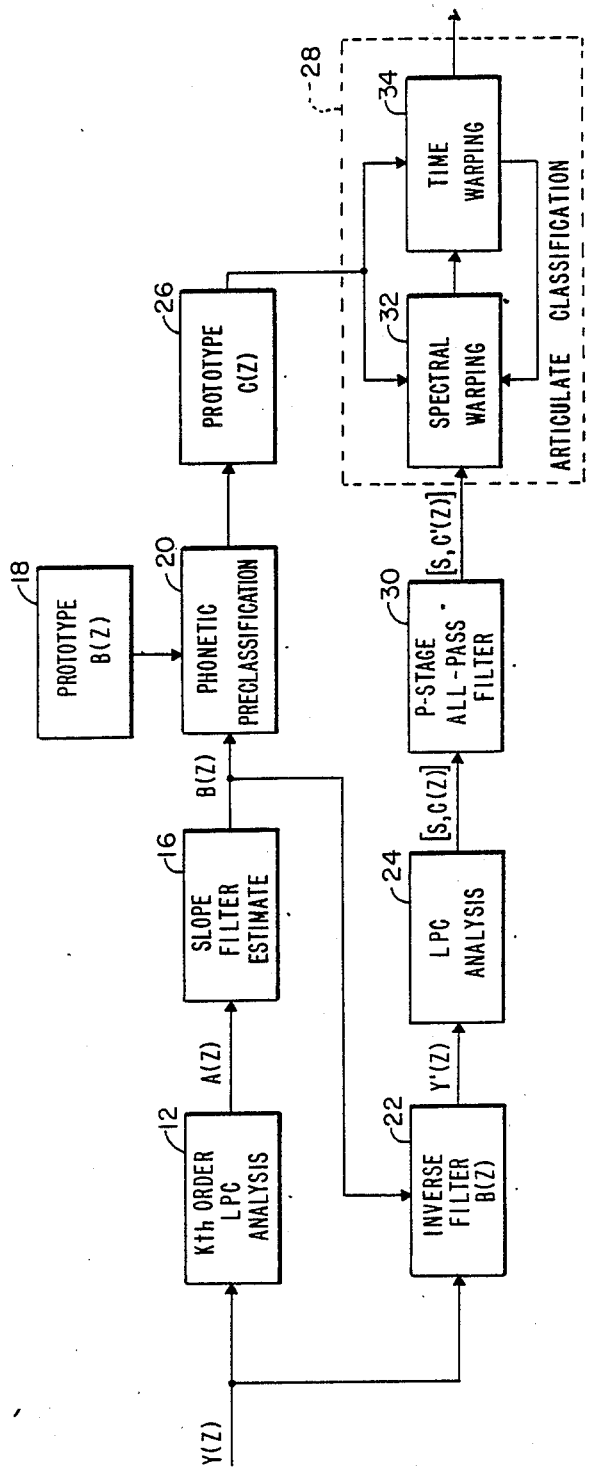
FIG. 1A is a block diagram of a speech recognition system embodying the present invention.
Figure 2A:
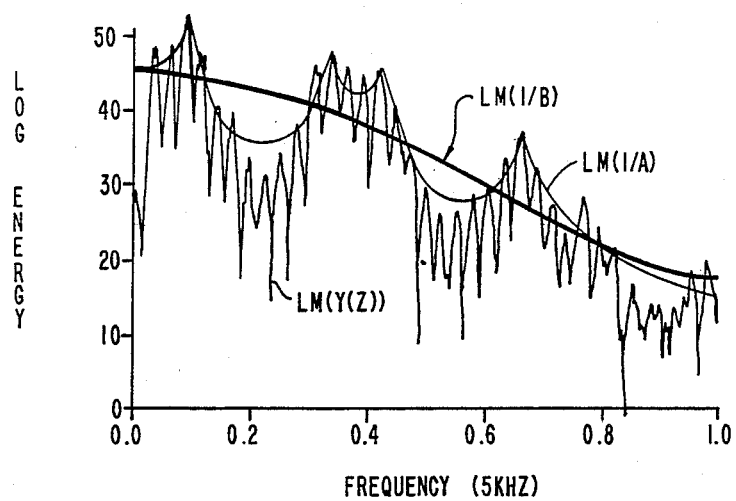
FIG. 2A is an illustration of the frequency characteristics of an incoming speech signal Y(z) applied to the speech recognition system of FIG. 1, the spectral envelope of that signal and the slope function B(z) of the signal.
Figure 2B:
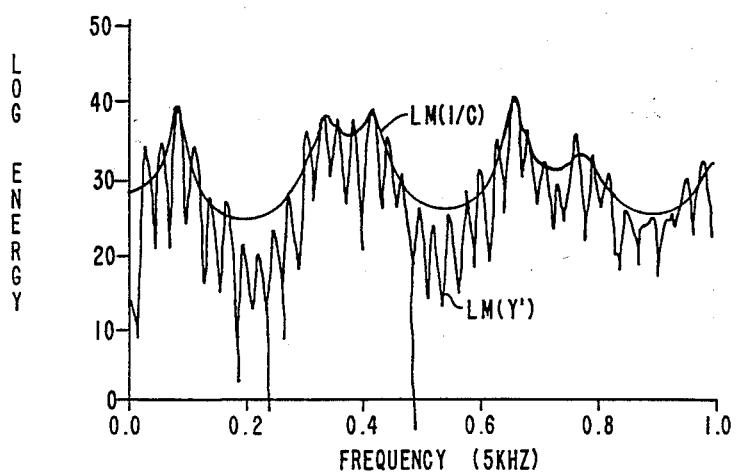
FIG. 2B is an illustration of the signal Y'(z) obtained by removal of the slope from the incoming signal.
Figure 2C:
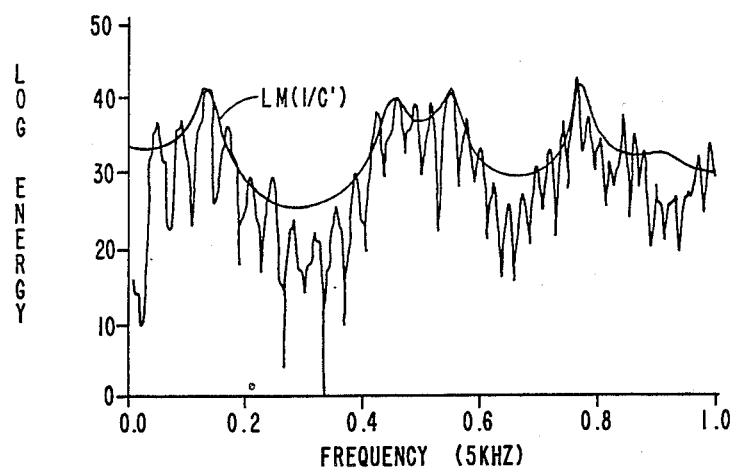
FIG. 2C illustrates the frequency characteristics of the frequency warped signal C'.

The speech recognition system of FIG. 1A receives a signal Y(z) comprising a series of speech samples. Those samples are divided into 20 frames of, for example, 256 samples. The frequency characteristics of a typical frame of speech are illustrated in FIG. 2A. A spectral envelope LM(1/A) demonstrates the typical formant peaks in the spectrum resulting from vocal tract resonance. The energy of the speech signal decreases with frequency as shown by the slope function, log magnitude of $|1/B(z)|^2 = LM(1/B)$.

A conventional LPC analysis 12 of order k equal to or greater than 10 is performed on each frame of samples. The LPC analysis provides a vector of LPC coefficients $a_i$ which define a filter A(z) corresponding to the frequency response of FIG. 2A. In accordance with the present invention those LPC coefficients are modified by a slope filter estimate 16 to produce a filter vector B(z) corresponding to the frequency response shown in FIG. 2A.

Figure 1B:
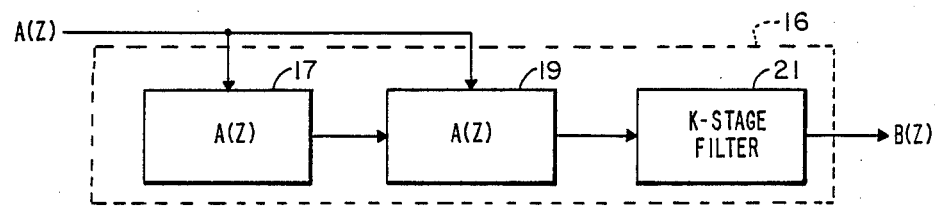
FIG. 1B is an illustration of one construction of the slope filter of FIG. 1A.

The slope filter estimate is based on the concatenation, with bandwidth expansion, of the inverse filter A(z) derived by the kth order LPC analysis 12. As illustrated in FIG. 1B, the slope filter B(z) corresponds to two in series LPC filters A(z), 17 and 19, which are subjected to bandwidth expansion in the k-stage filter 21. The bandwidth expansion tends to flatten out the response of the filter. When applied to a single filter A(z), it was found that the resultant filter only represented half of the spectral slope and the sum squared of the spectral difference between the LPC and slope spectra was not minimized. A much improved representation B(z) of the slope filter is obtained by concatentating the LPC filter with itself. The in-series A(z) filters enhance spectral tiltness and, with bandwidth expansion, provide a much improved slope filter.

Figure 1C:
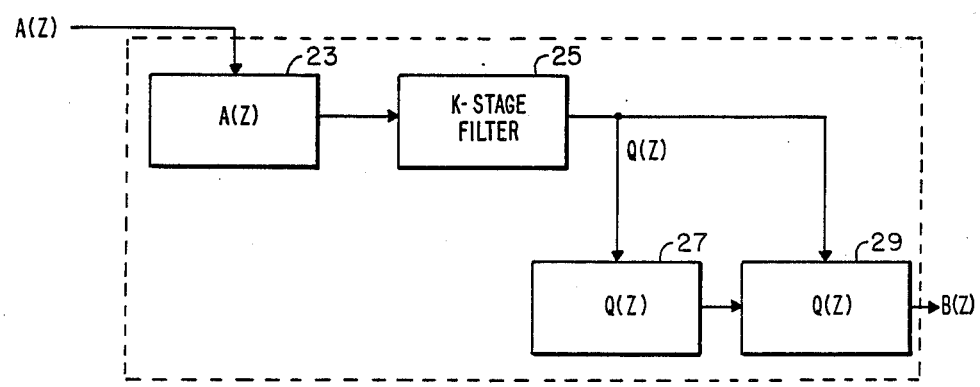
FIG. 1C is an illustration of an alternative construction of the slope filter of FIG. 1A.

An alternative approach to concatenation with bandwidth expansion is illustrated in FIG. 1C. In this approach the A(z) filter 23 is subjected to bandwidth expansion in the k-stage filter 25. The resultant filter Q(z) is then concatenated with itself at 27 and 29.

The same filter B(z) results from both approaches and is defined as follows. Based on the estimate of A(z), as in equation 1, from the nonprocessed speech, Y(z), a damped auto-regressive model is obtained as:

$$B(z) = 1 - \sum_{i=1}^{K} b_i(rz)^{-1} \tag{4}$$

Each $b_i$ is defined as the product of two identical A(z) filters, and they are given as the following:

$$b_i = \sum_{n=0}^{i} a_n a_{i-n}, \ i = 1, 2, \ldots, k \tag{5}$$

Here, $r = \exp(\pi DT)$, the bandwidth broadening factor that modifies the radius of z, is chosen as less than unity and equal to or greater than 0.5. D and T are respectively the bandwidth of the pole and the sampling interval. The a's are the LPC coefficients of A(z). More than two A(z) filters may be concatenated, and in that case $a_n$ would represent the result of a previous concatenation of filters and $a_{i-n}$ would represent the current LPC estimate A(Z) in accordance with equation 1.

The proper value of D, r, and the filter order k for speech sound sampled at 10 kHz is obtained as indicated in Table 1:

TABLE 1

OPTIMAL VALUE FOR SLOPE REMOVAL ALGORITHM

| Bandwidth D (in Hz) | Broadening Factor r | Filter Order k | Resultant Compensation Error Av. 0 |
| --- | --- | --- | --- |
| 1,000 | 0.63 | 10 | −0.02 |
| 2,000 | 0.53 | 10 | −0.002 |

As shown shown in FIG. 2, when the pole bandwidth widens to the degree indicated in Table 1, B(z) becomes a highly-damped all-zero filter. In other words, the log power spectrum with all of its original formant peaks degenerates to an asympotic slowly-varying spectrum, which is here regarded as the slope function, log magnitude of $|1/B(jw)|^2$, of the incoming signal.

For slope gradient computation, the first derivative at B(z) is $$B'(z) = \sum_{i=1}^{k} d_i (rz)^{-i}$$

where additional time delay $z^{-i}$ is omitted. Here $d_i = -rib_i$, the new coefficient that is proportionally weighted toward high order coefficients. Then the slope gradient should be $$\theta = -\text{Log }|B'(jw)|^2, 0.$$

Based on the observation at actual $\theta$ values, the maximum gradient is generally located at $\omega = \pi/2$. For a more stable estimate, a mean value within the range of $\pi/4 \leq \omega \leq 3\pi/4$ is preferred.

Let $\theta$ be the slope angle of the log $B^2(\omega)$, which is measured within the range of $\pi/4$ to $3\pi/4$ from the estimate:

$$\theta = \tan^{-1}\{E[\omega \log B^2(\omega)]/E[\omega^2]\} \qquad (6)$$

The numerator denotes the covariance of the product of the angular frequency and the log power, and the denominator denotes the variance of $\omega$. Note that all the variables have their means removed.

The following gradient estimate is recommended for any spectrum $H'(z)$ or $H(z) B(z)$, a spectrum compensated with a known slope filter $B(z)$:

$$\theta_m = \tan^{-1} E[w \log H'^2 m(w)], m = 1, 2, \ldots, M \text{ frames}, \qquad (7)$$

$$\theta = \text{Min }[E(\theta_m(k,r))].$$

Here, $\theta$ is the result of the average of $\theta_m$ across m frames of the speech sample. The $\theta$ of H' can be brought very close to zero angle by optimizing the order k of the slope filter and the broadening factor r with the two-stage cascade scheme. The typical values of these optimized coparameters are given in Table 1. By assessing the average $\theta_m$ across the representative vocabulary or the entire vocabulary, it is found that $\theta$ can be reached to within one percent error, which is nearly complete compensation, at which time $\theta = 0$.

Figure 3A:
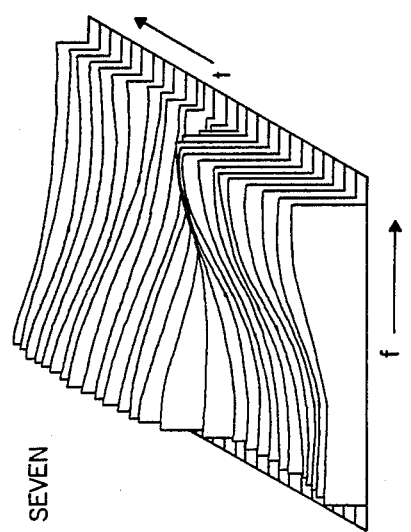

The slope function vector can also be used as a coarse phonetic representation of the state sequence of the incoming speech signal. The resulting templates from these state sequences for three sample words "seven", "nine" and "address" are shown in FIGS. 3A, 4A and 5A. Although the templates illustrate the frequency characteristics of individual vectors B(z) generated over time, the outputs of the LPC analysis 12 and filter 16 are in fact time domain vectors.

One novel application of this slope filter vector B(z) is used to carry out a broad phonetic classification of the incoming speech at 20 of FIG. 3A. The vector template of, for example, FIG. 3A is compared to a set of previously generated prototype templates 18 for an established vocabulary which the system is intended to recognize. If, for example, a system is intended to recognize any one of a thousand words, as few as fifty slope function templates may be used to approximate the slope vectors of those thousand words. Each of the fifty prototype templates may characterize a subset of about twenty words. The phonetic preclassification process may indicate that the incoming slope vector template is a close match to only one or two of the slope vector templates. Thereafter, in an articulate classification procedure to be described, a particular word of the subset of words selected in the preclassification process may be determined.

Since words can be spoken at different rates, one can not expect that the slope vectors will match the prototype vectors 18 exactly over time. The phonetic preclassification 20 must also be carried out by a dynamic programming technique which provides for time alignment of the vectors. The dynamic time warp technique performs a nonlinear time sequence adjustment of the incoming vector sequence {B(z)} to bring it into closer match with the prototype to which it is being compared, and the comparison is made of the overall time warped template against the prototype template.

The specific dynamic programming technique is described as follows. Given the vector sequence of a reference as $B_f$ where the frame number $f = 1, 2, \ldots, N$, the distance measuring matrix can use a similar slope gradient matrix for precise slope matching assessment:

$$\theta_{tr} = \text{Min }\{\theta_{tr}(Y_{it}B_{jr})_{w(i,j)}\} \qquad (8)$$

where $Y_{it}$ is the incoming test speech and $0_{tr}$ measures the slope gradient of the convolved output of $Y_{it} B_{jr}$ at the i-th test and j-th reference frame. The warping function, w(i,j), defines the warping path as in the dynamic programming algorithm.

For computational simplicity, a distance matrix using the maxiumum likelihood ratio of the LPC model, as originally devised by Itakura and later applied to variable-frame-rate coding for efficient speech recognition by Chuang and Chan, can also be used to assess the spectral slope matching deficiency. F. Itakura, "Minimal Prediction Residual Principle Applied to Speech Recognition," IEEE Trans. ASSP, Vol. 23, pp. 67–72, 1975; C. K. Chuang and S. W. Chan, "Speech Recognition Using Variable-Frame-Rate Coding,", IEEE ICASSP, pp. 1,033–1,036, April 1983. The log likelihood ratio is given by $$1(Y_r|Y_t) = \log [B'_r V_t B_r / B'_t V_t B_t] \qquad (9)$$

where $B_r$ and $B_t$ respectively represent the slope vector for reference and test speech. The $V_t$ represents the $(p+1)(p+1)$ covariance matrix derived from Y(n), the original nonprocessed signal.

Notice that template clustering, described below, over the $\{[B_{jr}]^r\}$ can also be performed for speaker-independent preclassification; however, frequency normalization is considered to be unnecessary in such a coarse feature preclassification. Moreover, due to the low order nature of the slope function, spectral-slope vector quantization can be approximated by a gradient value; a small class, such as less than sixteen, is sufficient for practical implementation.

With preclassification based on the vector B(z), further classification of the incoming speech is based on the speech with the slope normalized LPC. This is accomplished by an inverse filter 22 based on the slope vector B(z) for each frame of incoming samples. For a sequential estimation algorithm [Fukabayashi and C. K.

Chuan, "Speech Segmentation and Recognition Using Adaptive Linear Prediction Algorithm,"IEEE-ICASSP, pp 17.12.1-17.12.4, 1984], the vector B(z) derived from one frame can be used to filter the next frame of speech samples, particularly when the frame shift is shorter than half the sample of window length of the frame. Under such a scheme the slope of the incoming signal is recursively removed based on the preceding frame's characteristics.

When a spectral slope filter is defined as B(z), the slope-normalized LPC re-estimate C(z) is given as follows:

$$C(z) = H(z) B(z) = GB(z)/A(z)$$

which is a zero-pole filter. When reapplying an LPC analysis over H(z) B(z) in the time domain, the all-pole representation of C(z) is:

$$C(z) = 1 - \sum_{i=1}^{L} c_i z^{-i}, i = 1, 2, \ldots L, L > P$$

If the order of the coefficient is set sufficiently large, such as $L \geq (K+P)$, then by polymoninal division of B(z) by A(z), one obtains:

$$C(z) = 1 + (a_1 - b_1)z^{-1} + [(a_2 - b_2) + a_1(a_1 - b_1)]z^{-2} + \ldots$$

Under all-pole representation of C(z), the bandwidth reduction procedure can be applied to enhance the peak of formants in the frequency range of zero to $\pi$. Thus, $$C(z) = 1 - \sum_{i=1}^{L} c_i (r_c^{-1} z)^{-i}$$

with $r_c = exp(-\pi B_c T)$, where $B_c$ is about 50 Hz. This process emphasizes further the spectral matching on the resonant characteristics.

It is important to notice that the slope removal process can be flexibly controlled by choosing a proper value of r for the inverse filter 22. When r is set to zero, it results in a normal LPC representation in the second stage, and if r is set to 0.51, an optimal slope removed yields. Thus the filter 22 may be removed from the system, effectively setting r=0 in filter 22, and B(z) may be used solely for preclassification. In such a case, the speech signal would not be normalized to the slope vectors.

Figure 2D:
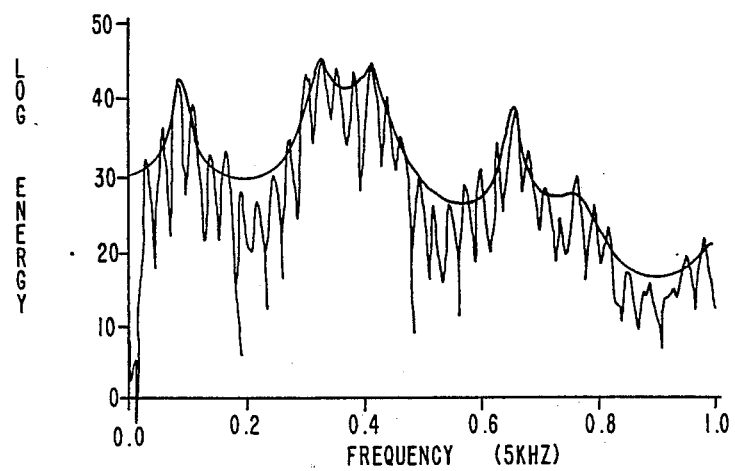
FIG. 2D illustrates the results of slope removal using a preemphasis approach for comparison to FIG. 2B.

With the slope thus removed, the frequency characteristics of the resultant 1/B(z) are as shown in FIG. 2A. Using B(z) as a zero filter, the spectral slope of Y(z) is removed, and re-applying an LPC analysis 24 results in a vector C(z) of coefficients which defines a filter having the frequency response illustrated by the spectral envelope of FIG. 2B. Directly computing G B(z)/A(z) also yields C(z). For comparison, the results of slope removal using a preemphasis in an LPC analysis is shown in FIG. 2D. Note that the slope is not as well removed.

Figure 3B:
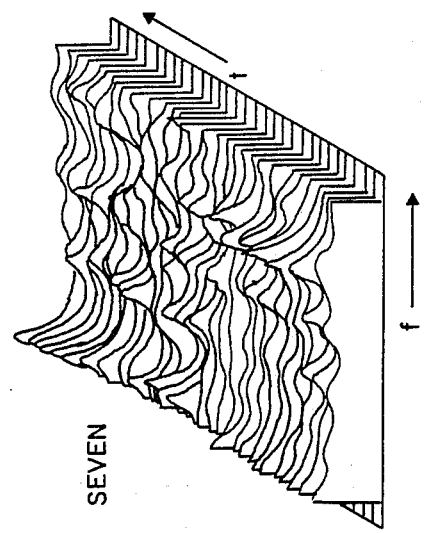
FIGS. 3A and 3B illustrate templates for the slope vectors B(z) and the formant vectors C(z) for the word "seven".
Figure 4B:
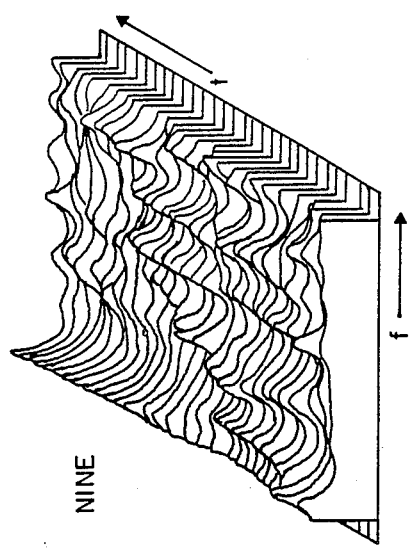
FIGS. 4A and 4B illustrate slope vector and formant vector for the word "nine".
Figure 4A:
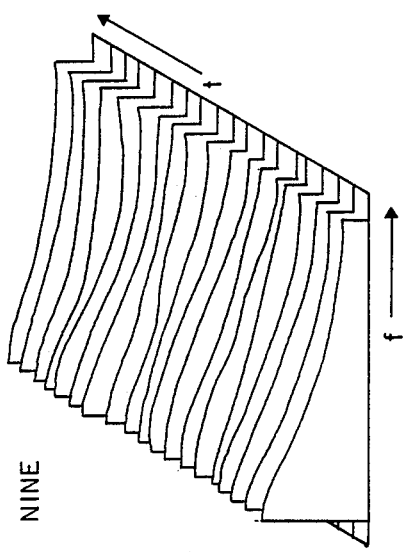
Figure 5B:
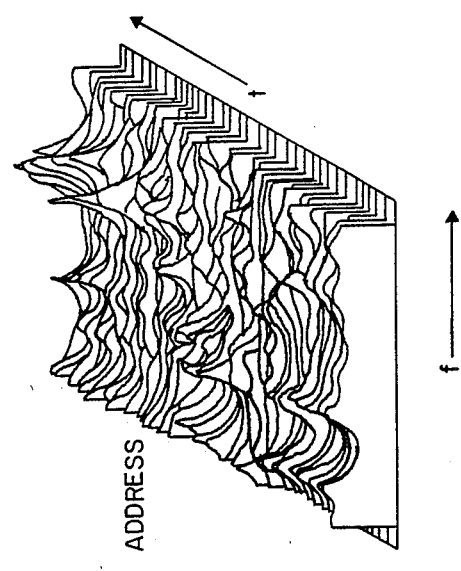
FIGS. 5A and 5B illustrate the slope vector and formant vector templates for the word "address".
Figure 5A:
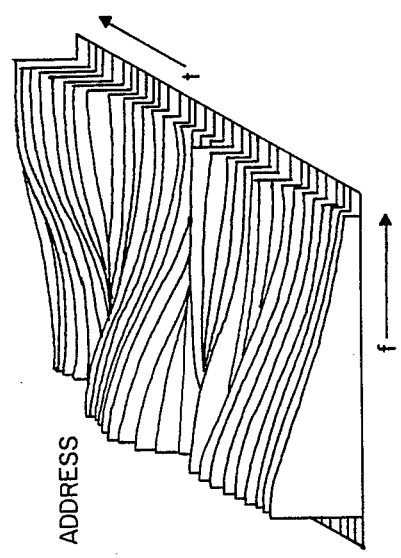

The resultant slope B(z) and normalized LPC C(z) for the words "seven", "nine" and "address" are illustrated in FIGS. 3B, 4B and 5B in a three-dimensional spectral sequence display. The vector template for the incoming speech is compared in a one-by-one basis to each of a subset of the prototype templates 26 of the entire system vocabulary. As already noted, the slope vector B(z) provides an initial broad classification which may reduce the entire vocabulary of, for example, one thousand words to a limited number of classes of words having like slope vector templates. Thus, the number of words from which a final selection must be made may be in the order of forty. Only formant vector templates for those forty words are selected from the prototype bank 26 for the final classification. The final classification may be based on the full LPC output [S,C(z)]but sufficient resolution is found with C(z) alone.

Figure 6:
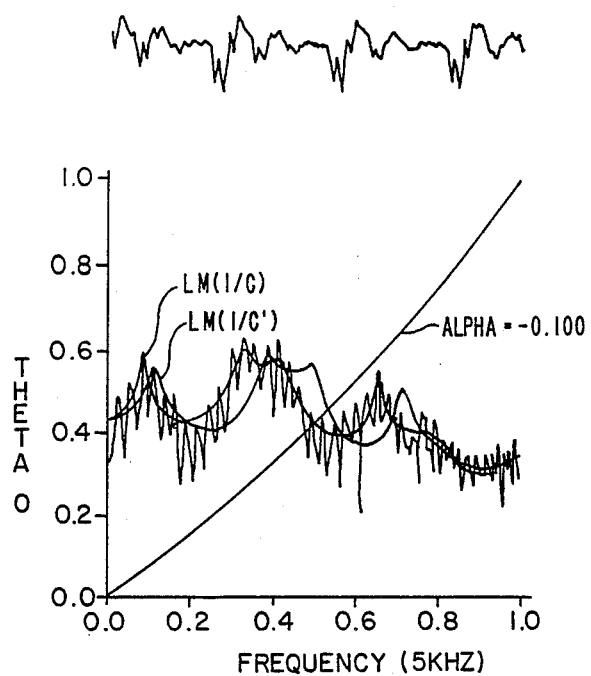
FIG. 6 is an illustration of a time domain waveform and of the frequency characteristics of its LPC signal and of the same signal transformed to expand the low frequency response and compress the high frequency response

Spectral expansion of the lower frequency signals in both the incoming speech and in the prototypes is desirable in order that the classification provides greater emphasis on the lower frequency signals. To that end, the vector C(z) resulting from the LPC analysis is filtered in a digital filter 30 for expansion and compression along the frequency axis to provide a vector C'(z) which is compared to the prototype vectors. An example of the nonlinear frequency warping of a signal is illustrated by the spectral representations of FIG. 6. In FIG. 6, the lower frequencies of the original signal are stretched out over the frequency axis and the higher frequency signals are compressed along the frequency axis. This provides a representation of the speech signal with a course approximation of the nonlinear property of the human auditory system.

With the spectral slope removed from Y(z), the physical variation in the vocal tract size and length from one individual to another for a given word is generally reflected as the formant frequency shift in the poles of 1/C(z). To normalize the signal C(z), a further frequency shift of the vector is desirable. However, due to the fact that the shift in formant frequency ratios $F_2/F_1$ and $F_3/F_1$ has no simple relationship, the so-called vocal tract length ratio scaling approach [H. Wakita "Vocal tract length estimate by inverse filtering", IEEE, ICASSP, 1977] is generally believed to be insufficient for a robust speaker normalization application. A nonlinear frequency transform demonstrates a more desirable procedure for spectral normalization.

To provide for spectral normalization, the comparison of the incoming vector [s, C(z)] is accomplished with spectral warping 32 of each vector along the frequency axis along with the time warping 34 previously described with respect to the phonetic preclassification. The spectral warping can be obtained inside the local loop of the error minimization routine of the time warping dynamic program. The final result of the dynamic programming 28, which provides for both spectral and time warping to provide the best match between the vector generated from the incoming signal and the limited subset of prototype vectors, is a single one of the words of the overall vocabulary.

One nonlinear frequency transfer function that possesses the unique features of simplicity and flexibility for change from compression to expansion is the all-pass digital filter that Oppenheim et al. devised for unequal spectral resolution analysis of digital signals.

$$H(z) = (z^{-1} - \alpha)/(1 - \alpha z^{-1}) \quad (10)$$

A. V. Oppenheim, D. H. Johnson, and K. Steiglitz, "Computation of Spectra with Unequal Resolution Using the Fast Fourier Transform," Proc. IEEE, Vol. 59, pp. 299–307, February 1971. That all-pass filter may be used for both the p-stage filter 30 and the spectral warping filter 32. The effective angular frequency transformation is governed by the following nonlinear phase relationship:

$$\Omega = f(\omega, \alpha) = \tan^{-1}[((1-\alpha^2)\sin\omega)/(1+\alpha^2)\cos\omega + 2\alpha)] \quad (11)$$

where $\omega$ and $\Omega$ denote the original and transformed frequencies and $\alpha$ denotes the only filter coefficient. By varying $\alpha$ from negative to positive, ($-0.3 \leq \alpha \leq 0.3$), holding its absolute magnitude less than 0.3, one can obtain either a moderately expanded or compressed $\Omega$ with respect to $\omega$.

By applying f($\omega$, $\alpha$) to the $\omega$, the objective of spectral warping than becomes that of minimizing the error spectrum:

$$\text{Min } [Q_j(f(\omega, \alpha_j) - Q_o(\omega)] \quad (12)$$

where $Q_j(\omega)$ represents the log power spectrum of the speech postfiltered by the slope filter B(z) and $Q_o$ is a reference log spectrum.

Figure 7A:
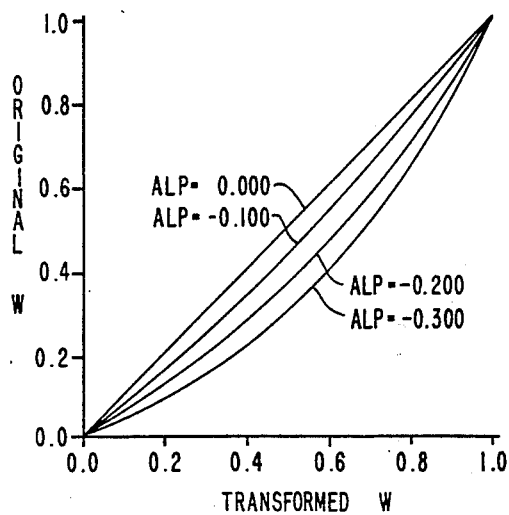
FIG. 7A is an illustration of a spectral compression and expansion function for various values of alpha for prewarping and FIG. 7B is a similar illustration for normalization.
Figure 7B:
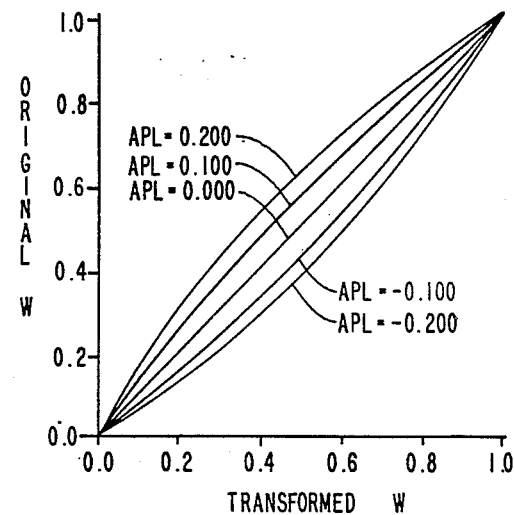

The near log transformation provided by the all-pass filter 30 and by the all-pass filtering in the spectral warping dynamic program 32 is illustrated in FIGS. 7A and 7B for various values of alpha. The initial near log transformation in filter 30 is obtained by setting alpha at a value less than or equal to $-0.3$ as illustrated in FIG. 7A. Thus, the lower half of the bandwidth is expanded and the upper half of the bandwidth is compressed. Then, individual vectors are obtained dynamically at 32 with $-0.2 \leq \alpha \leq 0.2$ as illustrated in FIG. 7B to accommodate individual normalization to minimize the error spectrum with respect to a selected reference. Combining this process with slope normalization is here regarded as speaker normalization. Because the positive alphas provide mirror image transforms to the negative alphas the combined effects of the initial spectral warping in filter 30 and the dynamic spectral warping 32 is an effective alpha equal to the difference between the two alphas. Thus, a signal having an initial spectral warping based on an alpha of $-0.2$ followed by dynamic spectral warping with an alpha of $+0.2$ will result in a final effective warping of an alpha of 0.0.

The dynamic program 28 incorporates the recursive dynamic programming algorithm presented by H. Sakoe and S. Chiba, "Dynamic Programming Algorithm Optimization for Spoken Word Recognition," IEEE Trans. ASSP, Vol. 26, pp. 43–49, 1978, with the spectral normalization algorithm described above. Let $\{G_j(\omega)\} j=1, \ldots, M$, and $\{F_i(\omega)\}$, $i=1, \ldots, N$ denote the reference and test sound spectral sequence respectively, and $D[\{F(\omega)\}, G(\omega)]$, the spectral distance between them. The recursive formula of the Sakoe-Chiba algorithm, is then modified as follows:

$$D[\{F(\omega)\},\{G(\omega)\}] = \text{Min} \sum_{k=1}^{N} d\{k,p(k),\text{Min}S[F_k(\omega),G_{p(k)}(\Omega)]\} \quad (13)$$

where $\Omega$ denotes the transferred frequency in which a given $\alpha$ value (in a step of $\Delta\alpha = 0.02$ to span $\pm 0.2$) optimizes the spectral distance S at k-th test frame. Assuming the vertical searching range is $\pm V$ frames, all 2V frames of $G(\Omega)$ must be subject to frequency transformation. By fixing $G(\Omega)$ at each optimal $\Omega$ function, the time sequence warping will then proceed to successive frames as the dynamic programming algorithm is performed. The d{k,p(k),Min S} functionally describes the local warping distance between the reference $G(\Omega)$ and test frame at $F_k(\omega)$ with a range of $s = \pm V$. Here, the so-called warping path p(k) indicates the nonlinearly warped frame location with the test frame presently at the k-th frame. The final optimized distance between the test sound [F($\omega$)] and the reference template G ($\Omega$) is then chosen from the warping path that gives minimal sum distance, as functionally given in equation 11.

Figure 8A:
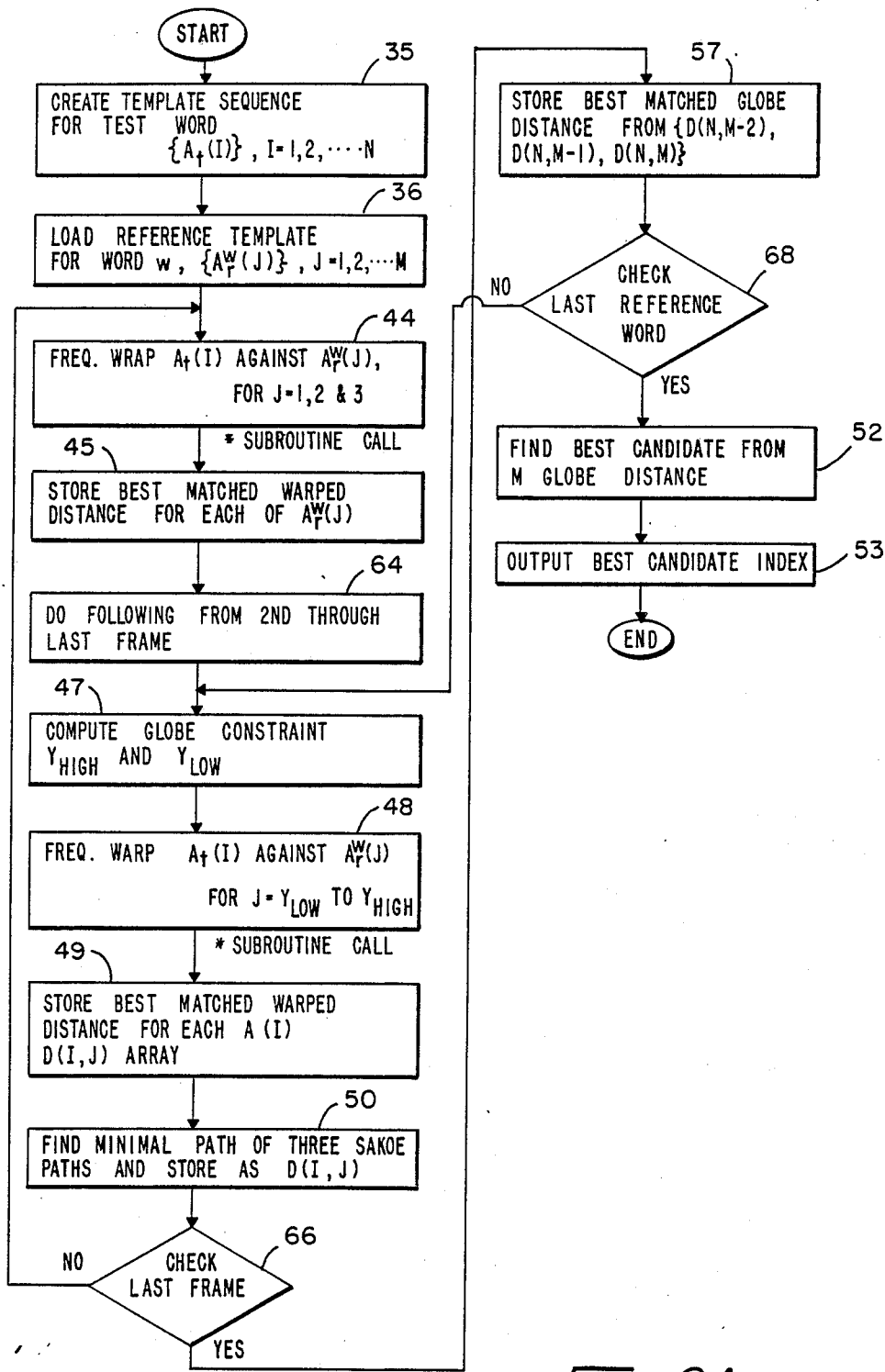
FIG. 8A is a flowchart for the articulate classification of FIG. 1A.

A flowchart of the word recognition algorithm of the articulate classification 28 using a dynamic programming and frequency warping combination is presented in FIG. 8A. The subroutine for frequency warping the test frame against multiple reference frames is presented in FIG. 8B.

In FIG. 8A, block 35 receives the feature vector sequence {A $_r$(I)}, i=1, 2, . . . , N from the front end analysis stage. N denotes the frame length of the vector. At block 36, the reference template is loaded one-by-one according to the word w specification.

Figure 8B:
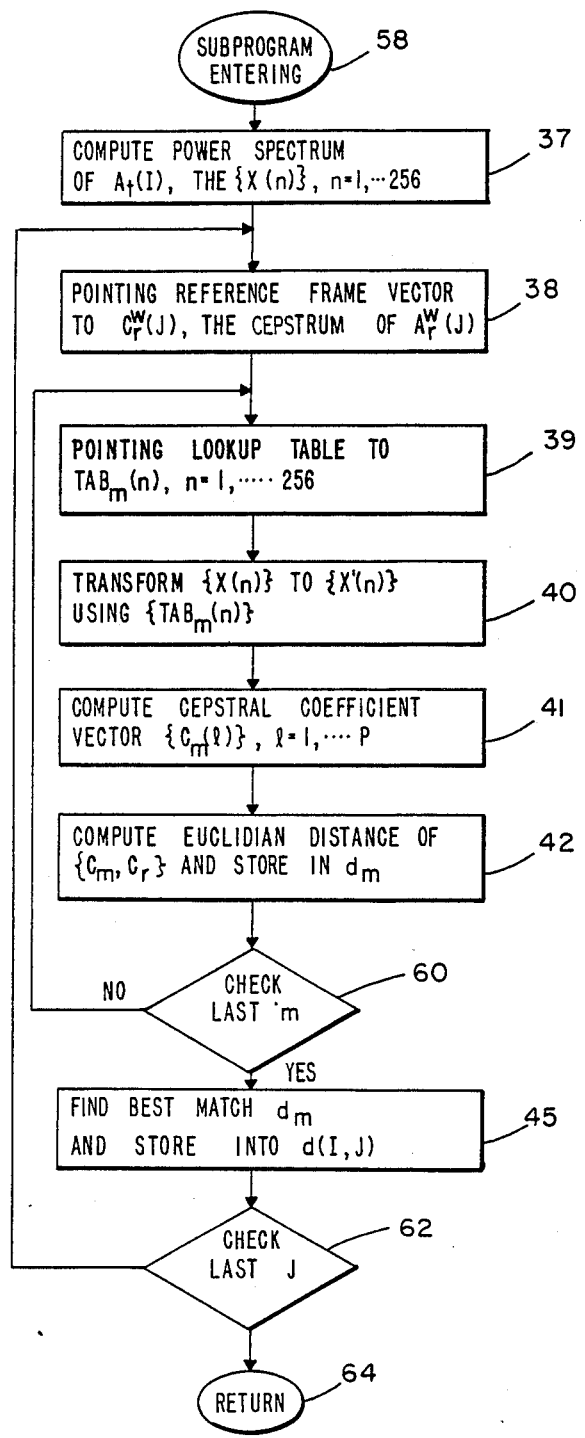
FIG. 8B is a subroutine from the flowchart of FIG. 8A for frequency warping the test frame against multiple reference frames.

At block 44, the process executes the call to the spectral warping routing, as shown in FIG. 8B, to warp {A $_r$(1)} against the first three reference frames, i.e., the {A $_r^w$(j)} for j=1,2 and 3.

From here the program flow shifts to the spectral warping subroutine, depicted in FIG. 8B with block number marked rom 37 to 43. At block 37, first the log power spectrum {X(n)}, n=1,2, . . ., 256 is transformed from the incoming LPC based filter {A $_r$(I)}.

In block 38, the reference vector is pointed to {C $_r^W$(J)}, the Cepstral LPC vector of the {A $_r^w$(j)} that are stored in the memory.

In block 39, the prestored warping table specified by the $\alpha_{max}$ and $\alpha_{min}$ is loaded for use in spectral warping.

The warping of the log power spectrum {X(n)} to {X'(n)}, n=1,2, . . ., 256 takes place in block 40 where the individual spectral element is warped according to the predefined warping table, the TAB$_m$(n),n=1,2, . . ., 256. Here the suffix m specifies the warping table. Then the vector C$_m$(l)l=1,2, . . ., P, viz., the final warped Cepstral LPC vector is obtained from {X'(n)} at 41.

In block 42, the Euclidean distance between the $C_m(1)$ and $C_j(1)$ is computed for the m-th warped spectrum and the distance is stored into $d_m$. Then, blocks 39 to 42 are repeated M times.

At block 43, the optimally warped representation for each of the warping variations is identified by finding the minimum across $\{d_m\}$, $m=1, \ldots M$.

From here the process returns back to FIG. 8A at block 44.

At block 45, the three computer distances passed back from the subprocess are stored.

From block 47 to 50, then the typical dynamic programming with recursive distance accumulation for each search path is executed.

At block 47, the global constraint bound $Y_{high}$ and $Y_{low}$ for the path search are specified.

In block 48, the spectral warping routine is called as in block 44. Block 48 executes similar spectral warping process for $\{A_i(I)\}$. The best warped pattern is selected to represent the optimal inter test and reference difference.

At block 50, the conventional three local branches search is executed to determine the best local branching at the path intersect of I and j. These spectral warping and path search processes are repeated until the last frame.

At the end of the best path search, the minimum is identified to represent the best path for that particular reference template. This is the function of block 51. The blocks from block 35 up to 51 constitute a dynamic programming (DP) search that incorporates with spectral warping process inside the DP recursive algorithm.

Then this upgraded DP algorithm is repeated for a W total words and then the reference word with minimal distance is chosen as the candidate for representing the incoming word. These two last processes are performed in blocks 52 and 53.

Thus, an LPC vector is first spectrally warped according to one of the fixed form, near log transformations illustrated in FIG. 7B depending on the alpha selected. In a subroutine in the dynamic time warp program, alpha can be stepped in increments of 0.01 to 0.02 to determine the spectral warping which provides the closest match to the reference template. It is significant that the spectral warping is by means of a closed form transformation as distinguished from the approach used by Matsumoto and Wakita. In that technique, the spectral warping was on a coefficient by coefficient basis of the log power spectrum in a dynamic programming algorithm operating in the frequency domain. The present closed form transformation technique greatly simplifies the spectral warping in selecting a single transformation function for the entire spectrum of a frame. The use of the closed form transformation on the LPC vector is particularly advantageous in simplifying the computations.

Preferably, a clustering technique is used in the generation of the prototypes 26 for speaker independent recognition. The clustering technique is based on the observation that representations of a single word by multiple speakers form a cluster, and that cluster can be represented by a limited number of token representations. S. E. Levinson, L. R. Robiner, A. Rosenberg, and J. G. Wilpon, "Interactive Clustering Techniques for Selecting Speaker-Independent Reference Templates for Isolated Work Recognition," IEEE Trans. on Acoust. Speech, and Signal Processing, Vol. 27, p. 134, 1979. This work extends that method by further reducing the inter-speaker difference before applying the clustering algorithm. Thus, fewer template centroids are needed for the same performance.

The use of preclassification reduces the number of total comparisons which must be made by the system. For example, with no preclassification, an incoming vector template would have to be compared to the total number of words in the vocabulary, for example, one-thousand. With the present system, for a vocabulary of one thousand words, the preclassification may require only a comparison of the first incoming vector template B(z) with about fifty prototype coarse classification templates followed by a comparison of the second incoming vector template C'(z) with about forty templates selected by the preclassification. As a result, the one-thousand comparisons of the single classification system may be replaced with less than one-hundred comparisons with the preclassification system. Also, because the slope vectors are slow changing functions which can be approximated by scalar functions with $\omega$ set to $\pi/2$, the preclassification comparison is simplified. Further, because removal of the slope from the incoming speech effectively normalizes the speech of many individuals, the individual prototype templates 26 can have a more limited number of tokens of each word cluster.

While the invention has been particulary shown and described with reference to a preferred embodiment thereof, it will be understood by those skilled in the art that various changes in form and details may be made therein without departing from the spirit and scope of the invention as defined by the appended claims. For example, although the spectral and time warping are described as being applied to the vectors of the incoming speech in the dynamic program, the reference prototype vectors may actually undergo the warping to provide the desired relative spectral or time warping. Further, while the invention is most advantageously applied to LPC vectors in the time domain, certain aspects of the invention can be applied to frequency domain represented vectors as well.

I claim:

1. A speech recognition system for recognizing units of speech input comprising:
   means for generating first speech vectors characteristic of units of a speech input;
   means for comparing the first speech vectors with first reference vectors corresponding to a set of reference speech units and for selecting a limited subset of the reference speech units for which the first reference vectors have the closest correspondence with the first speech vectors;
   means for generating second speech vectors characteristic of units of speech input normalized with respect to the first speech vectors; and
   means, responsive to the means for comparing the first speech vectors and to the means for generating the second speech vectors, for comparing the second speech vectors to second reference vectors corresponding to the selected subset of speech units and for selecting a speech unit of the subset for which the second reference vectors have the closest correspondence with the second speech vectors.

2. A speech recognition system as claimed in claim 1 wherein the first speech vectors define the magnitude slope of the frequency characteristics of a frame of speech samples.

3. A speech recognition system as claimed in claim 1 wherein:
the means for generating first speech vectors comprises means for performing a first linear predictive coding (LPC) analysis of the speech samples, and
the means for generating second speech vectors comprises an inverse filter based on the first speech vectors for filtering the speech samples and means for performing a second linear predictive coding analysis of the filtered samples.

4. A speech recognition system as claimed in claim 3 wherein the first speech vectors define the magnitude slopes of the frequency characteristics of frames of speech samples.

5. A speech recognition system as claimed in claim 4 wherein the means for generating first speech vectors comprises means for concatenating, with bandwidth expansion, an inverse filter of the first LPC analysis.

6. A speech recognition system as claimed in claim 5 wherein the first speech vectors correspond to an inverse filter defined by the function:

$$B(z) = 1 - \sum_{i=1}^{K} b_i(rz)^{-i}$$

where $$b_i = \sum_{n=0}^{i} a_n a_{i-n}, i = 1, 2, \ldots, k$$

r is a bandwidth broadening factor and $a_n$ and $a_{i-n}$ are the coefficients from the first LPC analysis.

7. A speech recognition system as claimed in claim 6 wherein $r = \exp(\pi DT)$ and D and T are respectively the bandwidth of the pole and the sampling interval.

8. A speech recognition system as claimed in claim 4 wherein the means for generating the second speech vectors comprises means for providing bandwidth reduction of the inverse filter of the second LPC analysis.

9. A speech recognition system as claimed in claim 4 wherein the means for comparing the second speech vectors comprises spectral warp means for causing a nonlinear spectral shift of the frequency characteristics of each vector of the speech vectors relative to the frequency characteristics of reference vectors in a closed form transformation to generate a spectrally warped vector which provides closer correspondence between the speech and reference vectors, a single predetermined transformation function being selected for an entire spectrum of a frame of speech samples.

10. A speech recognition system as claimed in claim 9 wherein the spectral warp means comprises an all-pass filter.

11. A speech recognition system as claimed in claim 9 wherein the means for comparing the second speech signals comprises a dynamic time warp program including the special warp means.

12. A speech recognition system as claimed in claim 11 further comprising prewarp means for causing a nonlinear spectral shift of the frequency characteristics of each vector prior to the dynamic program.

13. A speech recognition system as claimed in claim 3 wherein the means for generating the second speech vectors comprises means for providing bandwidth reduction of the inverse filter of the second LPC analysis.

14. A speech recognition system claim in claim 13 wherein the means for providing bandwidth reduction produces vectors of the form $$C(z) = 1 - \sum_{i=1}^{L} c_i(r_c^{-1}z)^{-i}$$

wherein $r_c$ is a bandwidth reduction factor equal to exp $(\pi \beta_c T)$ where $\beta_c$ is about 50 Hz and T is the sampling interval.

15. A speech recognition system as claimed in claim 3 wherein the means for comparing the second speech signals comprises spectral warp means for causing a normalizing nonlinear spectral shift of the frequency characteristics of each vector of the second speech vectors relative to the frequency characteristics of second reference vectors in a closed form transformation to generate a spectrally warped vector which provides a closer correspondence between the speech and reference vectors, a single predetermined transformation function being selected for an entire spectrum of a frame of speech samples.

16. A speech recognition system as claimed in claim 15 wherein the spectral warp means comprises an all-pass filter.

17. A speech recognition system as claimed in claim 15 wherein the spectral warp means comprises a routine within a dynamic time warp program which causes a nonlinear time shift of the second speech vectors relative to second reference vectors to provide a closer correspondence between the second speech vectors and second reference vectors.

18. A speech recognition system as claimed in claim 17 further comprising prewarp means for causing a nonlinear spectral shift of the frequency characteristics of each vector prior to the dynamic program.

19. A speech recognition system for recognizing units of speech input comprising:
means for generating speech vectors characteristic of units of speech input; and
means for comparing the speech vectors with reference vectors corresponding to a set of reference speech units, the means for comparing including spectral warp means for causing a nonlinear spectral shift of the frequency characteristic of each vector of the speech vectors relative to the frequency characteristics of the reference vectors in a closed form transformation to generate a spectrally warped vector which provides closer correspondence between the speech and reference vectors, a single predetermined transformation function being selected for an entire spectrum of a frame of speech samples.

20. A speech recognition system as claimed in claim 19 wherein the means for generating speech vectors comprises means for performing a linear predictive coding analysis and the spectral warp means comprises an all-pass filter for causing a near log spectral transformation.

21. A speech recognition system as claimed in claim 19 wherein the means for comparing the speech vectors comprises a dynamic time warp program means including the spectral warp means.

22. A speech recognition system as claimed in claim 21 further comprising prewarp means for causing a nonlinear spectral shift of the frequency characteristics of each vector prior to the dynamic program.

23. A system for generating coefficients of an inverse filter corresponding to the slope of the frequency characteristics of a linear predictive coding (LPC) vector comprising:
  means for performing an LPC analysis to generate linear prediction coefficients of an LPC inverse filter; and
  filter estimate means for generating the coefficients of the inverse filter corresponding to the slope by concatenating, with bandwidth expansion, the LPC inverse filter with itself.

24. A system as claimed in claim 23 wherein the filter estimate means includes means for concatenating the LPC inverse filter with itself and for then subjecting the resultant filter to bandwidth expansion.

25. A system as claimed in claim 23 wherein the filter estimate means subjects the LPC inverse filter to bandwidth expansion and then concantenates the resultant filter with itself.

26. A system as claimed in claim 23 wherein the inverse filter corresponding to the slope is defined by the function:

$$B(z) = 1 - \sum_{i=1}^{K} b_i(rz)^{-i}$$

where $$b_i = \sum_{n=0}^{i} a_n a_{i-n}, \quad i = 1, 2, \ldots, k$$

r is a bandwidth broadening factor and $a_n$ and $a_{i-n}$ are the LPC coefficients from the LPC analysis.

27. A system as claimed in claim 26 wherein $r = \exp(\pi DT)$ and D and T are respectively the bandwidth of the pole and the sampling interval.

28. A speech recognition system for recognizing units of speech input comprising:
  first linear predictive coding (LPC) analysis means for generating first speech vectors characteristic of units of speech input;
  means for comparing the first speech vectors with first reference vectors corresponding to a set of reference speech units and for selecting a limited subset of the reference speech units for which the first reference vectors have the closest correspondence with the first speech vectors;
  an inverse filter based on the first speech vectors for filtering the speech samples;
  second linear predictive coding analysis means, coupled to receive filtered speech samples from the inverse filter, for generating second speech vectors characteristic of units of speech input; and
  means for comparing the second speech vectors to second reference vectors corresponding to the selected subset of speech units and for selecting a speech unit of the subset for which the second reference vectors have the closest correspondence with the second speech vectors, the means for comparing comprising a dynamic time warp program which causes a nonlinear time shift of the second speech vectors relative to the second reference vectors to provide a closer correspondence between the speech and reference vectors, the dynamic time warp program including a spectral warp routine for causing a normalizing nonlinear spectral shift of the frequency characteristics of each vector of the second speech vectors relative to the frequency characteristics of the second reference vectors in a closed form transformation to generate a spectrally warped vector which provides a closer correspondence between the speech and reference vectors.

29. A speech recognition system as claimed in claim 28 wherein each of the first speech vectors defines the magnitude slope of the frequency characteristics of the frame of speech samples.

30. A speech recognition system as claimed in claim 29 wherein the means for generating first speech vectors comprises means for concatenating, with bandwidth expansion, the inverse filter of the first LPC analysis.

31. A speech recognition system as claimed in claim 28 wherein the means for generating the second speech vectors comprises means for providing bandwidth reduction of the inverse filter of the second LPC analysis.

32. A speech recognition system as claimed in claim 28 further comprising a prewarp filter wherein the LPC coefficients generated by the second LPC analysis undergo a nonlinear spectral transformation prior to the dynamic time warp program.

33. A speech recognition system as claimed in claim 28 wherein the spectral warp routine includes an all-pass filter.

34. A speech recognition system as claimed in claim 28 wherein the second reference vectors are token representations of clusters of speech representations.

35. A method of recognizing units of speech input comprising:
  generating first speech vectors characteristic of units of speech input;
  comparing the first speech vectors with first reference vectors corresponding to a set of reference speech units to select a limited subset of reference speech units for which the first reference vectors have the closest correspondence with the first speech vectors;
  generating from the speech input second speech vectors characteristic of units of speech input normalized with respect to the first speech vectors; and
  comparing the second speech vectors to second reference vectors corresponding to the selected subset of speech units to select the speech unit of the subset for which the second reference vectors have the closest correspondence with the second speech vectors.

36. A method as claimed in claim 35 further comprising filtering the speech samples in an inverse filter based on the first speech vectors and generating the second speech samples from the inverse filtered speech.

37. A method as claimed in claim 36 wherein the first and second speech vectors are generated by means of respective linear predictive coding analyses.

38. A method as claimed in claim 37 wherein the first speech vectors define the magnitude slopes of the frequency characteristics of frames of speech samples.

39. A method as claimed in claim 38 wherein the first speech vectors are generated by performing an LPC analysis to generate an LPC inverse filter and concatenating, with bandwidth expansion, the inverse filter with itself.

40. A method as claimed in claim 37 further comprising providing bandwidth reduction of the LPC filter of the second LPC analyis.

41. A method as claimed in claim 37 wherein the second speech vectors are compared in a dynamic time warp program including a spectral warp routine for causing a normalizing nonlinear spectral shift of the frequency characteristics of each vector of the second speech vectors relative to the frequency characteristics of the corresponding vector of the second reference vectors in a closed form transformation to generate a spectrally warped vector which provides a closer correspondence between the speech and reference vectors.

42. A method as claimed in claim 41 further comprising causing a nonlinear spectral shift of the frequency characteristics of each vector prior to the dynamic time warp program.

43. A method of recognizing speech comprising:
generating speech vectors characteristic of speech samples; and
comparing the speech vectors with reference vectors corresponding to a set of reference speech units to select a speech unit for which the reference vectors have the closest correspondence with the speech vectors, the comparison including the step of causing a nonlinear spectral shift of the frequency characteristics of each vector of the speech vectors relative to the frequency characteristics of the corresponding vector of the reference vectors in a closed form transformation to generate a spectrally warped vector which provides a closer correspondence between the speech and reference vectors, a single predetermined transformation function being selected for an entire spectrum of a frame of speech samples.

44. A method as claimed in claim 43 wherein the speech vectors are generated in a linear predictive coding analysis and the nonlinear spectral shift is by means of an all-pass filter.

45. A method as claimed in claim 43 wherein the speech vectors are compared in a dynamic time warp program including a routine for causing the nonlinear spectral shift.

46. A method as claimed in claim 45 further comprising causing a nonlinear spectral shift of the frequency characteristics of each speech vector prior to the dynamic time warp program.

47. A method of generating coefficients of an inverse filter corresponding to the slope of the frequency characteristics of an LPC vector comprising performing an LPC analysis to generate linear prediction coefficients of an LPC inverse filter and concatenating, with bandwidth expansion, the LPC inverse filter with itself.

48. A method as claimed in claim 47 wherein the generated inverse filter is defined by the function:

$$B(z) = 1 - \sum_{i=1}^{K} b_i(rz)^{-1}$$

where $$b_i = \sum_{n=0}^{i} a_n a_{i-n}, i = 1, 2, \ldots, K.$$

$r$ is a bandwidth broadening factor and $a_n$ and $a_{i-n}$ are the LPC coefficients from the LPC analysis.

49. A method as claimed in claim 48 wherein $r = \exp(\lambda DT)$ and D and T are respectively the bandwidth of the pole and the sampling interval.

50. A speech recognition system for recognizing units of speech input comprising:
means for generating first speech vectors characteristic of units of a speech input, each speech vector defining the magnitude slope of the frequency characteristics of a frame of speech samples;
means for comparing the first speech vectors with first reference vectors corresponding to a set of reference speech units and for selecting a limited subset of the reference speech units for which the first reference vectors have the closest correspondence with the first speech vectors;
means for generating second speech vectors characteristic of units of speech input; and
means, responsive to the means for comparing the first speech vectors and to the means for generating the second speech vectors, for comparing the second speech vectors to second reference vectors corresponding to the selected subset of speech units and for selecting a speech unit of the subset for which the second reference vectors has the closest correspondence with the second speech vectors.

51. A method of recognizing units of speech input comprising:
generating first speech vectors characteristic of units of speech input, each speech vector defining the magnitude slope of the frequency characteristics of a frame of speech samples;
comparing the first speech vectors with first reference vectors corresponding to a set of reference speech units to select a limited subset of reference speech units for which the first reference vectors have the closest correspondence with the first speech vectors;
generating from the speech input second speech vectors characteristic of units of speech input; and
comparing the second speech vectors to second reference vectors corresponding to the selected subset of speech units to select the speech unit of the subset for which the second reference vectors have the closest correspondence with the second speech vectors.

* * * * *